US008560538B2

(12) United States Patent
Shibata et al.

(10) Patent No.: US 8,560,538 B2
(45) Date of Patent: Oct. 15, 2013

(54) INFORMATION PROCESSING DEVICE, CONTENT MANAGEMENT SYSTEM, METHOD, AND COMPUTER READABLE MEDIUM FOR MANAGING CONTENTS

(75) Inventors: Hiroshi Shibata, Aichi-ken (JP); Hiroyuki Sasaki, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 696 days.

(21) Appl. No.: 12/413,536

(22) Filed: Mar. 28, 2009

(65) Prior Publication Data

US 2009/0248681 A1 Oct. 1, 2009

(30) Foreign Application Priority Data

Mar. 31, 2008 (JP) ................................. 2008-089610

(51) Int. Cl.
*G06F 7/06* (2006.01)
*G06F 7/20* (2006.01)

(52) U.S. Cl.
USPC ............................ 707/736; 707/732; 707/758

(58) Field of Classification Search
None
See application file for complete search history.

(56) References Cited

U.S. PATENT DOCUMENTS

| | | | | |
|---|---|---|---|---|
| 6,625,335 | B1 * | 9/2003 | Kanai | 382/306 |
| 7,239,406 | B1 * | 7/2007 | Piersol et al. | 358/1.15 |
| 7,685,209 | B1 * | 3/2010 | Norton et al. | 707/803 |
| 7,827,198 | B2 * | 11/2010 | Narahara et al. | 707/791 |
| 2004/0034660 | A1 * | 2/2004 | Chen et al. | 707/104.1 |
| 2004/0049501 | A1 * | 3/2004 | Mochizuki | 707/3 |
| 2005/0278379 | A1 * | 12/2005 | Nakazawa | 707/104.1 |
| 2006/0288006 | A1 * | 12/2006 | Eschbach et al. | 707/6 |
| 2007/0051793 | A1 * | 3/2007 | Katoh et al. | 235/375 |
| 2007/0236729 | A1 * | 10/2007 | Yoda | 358/1.15 |
| 2008/0092231 | A1 * | 4/2008 | Awata | 726/19 |

FOREIGN PATENT DOCUMENTS

| | | | |
|---|---|---|---|
| JP | 11272707 A | * | 10/1999 |
| JP | 2001-231059 A | | 8/2001 |
| JP | 2005-020256 A | | 1/2005 |
| JP | 2005020256 A | * | 1/2005 |

OTHER PUBLICATIONS

Hull, John and Peter Hart, "Toward Zero-Effort Personal Document Management," Mar. 2001, Computer vol. 34 Issue 3, pp. 30-35.*
Hull, John and Peter Hart, Toward Zero-Effort Personal Document Management, Mar. 2001, Computer, vol. 34, Issue 3, pp. 30-35.*

* cited by examiner

*Primary Examiner* — Anteneh Girma
*Assistant Examiner* — Miranda Huang
(74) *Attorney, Agent, or Firm* — Baker Botts L.L.P.

(57) ABSTRACT

An information processing device includes a content database storing contents with metadata and a keyword associated with each content, the metadata which accompanies each content and includes a plurality of items of data, a user database storing user identifiers with a specific item of the metadata associated with each user identifier, an acquiring unit acquiring new content and new metadata, an identifier extracting unit extracting a user identifier from the new metadata, a specific item specifying unit specifying a specific item associated with the extracted user identifier based on the user database, a keyword extracting unit extracting from the content database keywords associated with data identical to data of the specific item in the new metadata, a keyword selecting unit selecting a keyword from the extracted keywords, and a registration unit registering in the content database the selected keyword in association with the new content and the new metadata.

18 Claims, 10 Drawing Sheets

FIG. 1

CONTENT TABLE

| ID | DATA | TYPE | TELEPHONE NUMBER | F CODE | DATA AND TIME | SHEET SIZE | THUMBNAIL | SEARCH KEYWORD |
|---|---|---|---|---|---|---|---|---|
| D001 | \xx\xx\xxx.xxx | RECEIVED FAX DATA | xx-xx-xx | F002 | xx.xx.xx | A4 | \xx\xx\xxx.xxx | "UNCLASSIFIED" |
| D002 | \xx\xx\xxx.xxx | TRANSMITTED FAX DATA | xx-xx-xx | F002 | xx.xx.xx | B5 | \xx\xx\xxx.xxx | "PROJECT A" |
| D003 | \xx\xx\xxx.xxx | RECEIVED FAX DATA | xx-xx-xx | F002 | xx.xx.xx | A4 | \xx\xx\xxx.xxx | "PROJECT A" |
| D004 | \xx\xx\xxx.xxx | RECORDED VOICE DATA | xx-xx-xx |  | xx.xx.xx |  |  | "PROJECT B" |
| ... | ... | ... | ... | ... | ... | ... | ... | ... |

FIG. 2

USER DATABASE

| ID | USER NAME | F CODE | SIGNIFICANT ITEM |
|---|---|---|---|
| N001 | UNIDENTIFIED | 001 | DATA AND TIME |
| N002 | AAA | 002 | TYPE |
| N003 | BBB | 003 | SHEET SIZE |
| ⋮ | ⋮ | ⋮ | ⋮ |

INFORMATION PROCESSING DEVICE, CONTENT MANAGEMENT SYSTEM, METHOD, AND COMPUTER READABLE MEDIUM FOR MANAGING CONTENTS

CROSS-REFERENCE TO RELATED APPLICATION

This application claims priority under 35 U.S.C. §119 from Japanese Patent Application No. 2008-089610 filed on Mar. 31, 2008. The entire subject matter of the application is incorporated herein by reference.

BACKGROUND

1. Technical Field

The following description relates to one or more content management techniques for managing acquired content in association with at least one keyword.

2. Related Art

An information processing device such as a printer and a facsimile machine is configured to acquire various kinds of contents. For example, a printer is adapted to acquire a data file to be printed (print content) from a terminal device. Further, a facsimile machine is adapted to acquire facsimile data (facsimile content) to be received or transmitted, from an internal scanner unit or an external device. An information processing device having a telephone function can acquire (record) voice messages (voice communication content).

It is convenient to save content acquired by an information processing device in a searchable manner. In this case, it is desirable to save the acquired content in association with at least one keyword to search an intended one of contents saved. A search keyword is designated by a user based on what kind of information is contained in the acquired content.

Japanese Patent Provisional Publication No. 2005-20256 (hereinafter, simply referred to as '256 Publication) discloses a data management device (an information processing device) adapted to assist a user to easily designate a keyword. The data management device disclosed in '256 Publication is connected with an image scanner via a network. The image scanner is configured to create a reduced image of scanned image data (image content) and transmit the reduced image to the data management device. The data management device extracts discriminative parameters from the reduced image received, and then extracts possible keywords associated with the reduced image based on the discriminative parameters. The possible keywords extracted are sent to the image scanner. The image scanner displays the possible keywords. Subsequently, the image scanner transmits to the data management device the acquired image data and a keyword selected by the user from the possible keywords. The data management device stores the scanned image data and saves the keyword selected by the user in association with the image data.

SUMMARY

The data management device in '256 Publication is configured to newly create keywords each time acquiring new content. The user can select a desired keyword from the newly created keywords. In the meantime, the data management device may be utilized by two or more users. In this case, the users have their respective desired keywords. In other words, the users wish to select their respective keywords based on their own standards. For example, a user A may classify acquired facsimile data on the basis of the telephone numbers of the sending source devices of the facsimile data, while a user B may classify acquired facsimile data on the basis of the date and time when the facsimile data is received. In this respect, the data management device in '256 Publication creates keywords based on the discriminative parameters of image data whoever utilizes the data management device. Therefore, the data management device in '256 Publication configured to create keywords in such a uniform fashion cannot extract keywords that meet a requirement of each user.

Aspects of the present invention are advantageous to provide one or more improved information processing devices, content management systems, methods and computer readable media therefor that make it possible to manage content in association with at least one keyword extracted to comply with a requirement of each user.

When all keywords associated with contents stored in a database are extracted as possible keywords that may be associated with newly acquired content, a user needs a lot of efforts to search an desired one of the possible keywords extracted. Further, even keywords which do not comply with a standard of the user of the new content are provided. For these reasons, aspects of the present invention is advantageous to narrow down the possible keywords to be provided, based on the metadata accompanying the content. Here, the "metadata" denotes data definitely specified along with the acquisition of the content. The "metadata" is sometimes referred to as "Data about Data." For example, a destination address, a sending source address, or a title of an e-mail corresponds to metadata accompanying the e-mail. The metadata may include:

- a user identifier for identifying a user as a content sender (a telephone number of a calling source, an address of a mail sender, etc.)
- a user identifier for identifying a user as a content receiver (a telephone number of a call receiver, an address of a mail receiver, an F code for facsimile data, etc.)
- the sort of a function to acquire the content (a facsimile function, a mail function, a print function, a copy function, etc.)
- the date and time when the content has been acquired
- the title of the content
- the number of sheets for the content acquired
- a sheet size The user identifier for identifying the user as a content receiver and the user identifier for identifying the user as a content sender are as a whole referred to as a user identifier for identifying a user of the content. Further, when the content is print data, a file name of a file to be printed is one of the metadata. Thus, the metadata may contain a plurality of items of data such as the title of the content acquired, the user identifier for identifying the user of the content, the date and time when the content has been acquired, and the sort of the function to acquire the content.

The user of the content (the user as a content sender or the user as a content receiver) may classify the content based on the metadata accompanying the content. In addition, when the content is classified based on the metadata, the content is likely to be classified focusing on a specific item of the metadata. For instance, the content may be classified with respect to the sort of the function to acquire the content. The specific item differs from a user of the content to another. In the following description, an item on which the user focuses among the plurality of items of the metadata will be referred to as a "specific item" or a "significant item." In some aspects of the present invention, respective significant items of users are previously stored, keywords are extracted that are associated with past contents which have the same data as data of the significant item included in the newly acquired metadata. Therefore, the extracted keywords are narrowed down, and thus it allows the user to more easily select a desired one or more keywords from the extracted keywords.

According to aspects of the present invention, an information processing device is provided, which includes a content database, a user database, an acquiring unit, an identifier extracting unit, a specific item specifying unit, a keyword selecting unit, and a registration unit. The content database is configured to store contents with metadata and at least one keyword associated with each of the contents. The metadata is data accompanying each of the contents and includes a plurality of items of data. The user database is configured to store user identifiers with a specific item of the metadata associated with each of the user identifiers. Each of the user identifiers is an identifier adapted to identify a user of each of the contents. The acquiring unit is configured to acquire new content and new metadata accompanying the new content. The identifier extracting unit is configured to extract a user identifier for identifying a user of the new content, from the new metadata acquired by the acquiring unit. The specific item specifying unit is configured to specify a specific item associated with the extracted user identifier, based on the user database. The keyword extracting unit is configured to extract keywords associated with data identical to data of the specified specific item included in the new metadata, from the content database. The keyword selecting unit is configured to select at least one keyword from the keywords extracted by the keyword extracting unit. The registration unit is configured to register, in the content database, the at least one keyword selected through the keyword selecting unit, in association with the new content and the new metadata.

In some aspects of the present invention, the information processing device is provided with the user database in which a specific item of metadata is associated with each user identifier. Thereby, it is possible to specify a significant item (a specific item) on which the user of the newly acquired content focuses. The information processing device extracts keywords associated with the same data as the data of the specific item included in the newly acquired metadata, from the content database. Through this process, keywords that the user is highly likely to designate for the new content can be extracted. The user can designate from the extracted keywords at least one keyword that the user desires to get associated with the newly acquired content. The keyword selecting unit selects the at least one keyword designated by the user. The registration unit registers in the content database the at least one keyword selected, in association with the newly acquired content and metadata. Hence, the information processing device allows the user to easily designate at least one keyword that the user desires to get associated with the new content, from past keywords narrowed down based on the significant item. Thus the information processing device can manage acquired contents searchably by with at least one keyword associated with each of the acquired contents. It is noted that, "newly acquired content" or "new content" represents content that has been acquired by the acquiring unit and not been registered in the content database. Further, "newly acquired metadata" or "new metadata" denotes metadata accompanying the new content (newly acquired content).

According to aspects of the present invention, further provided is a content management system configured to manage contents with at least one keyword associated with each of the contents. The content management system includes a content database configured to store the contents with metadata and the at least one keyword associated with each of the contents, wherein the metadata is data accompanying each of the contents and includes a plurality of items of data, a user database configured to store user identifiers with a specific item of the metadata associated with each of the user identifiers, the user identifiers each of which is an identifier adapted to identify a user of each of the contents, an acquiring unit configured to acquire new content and new metadata accompanying the new content, an identifier extracting unit configured to extract a user identifier for identifying a user of the new content, from the new metadata acquired by the acquiring unit, a specific item specifying unit configured to specify a specific item associated with the extracted user identifier, based on the user database, a keyword extracting unit configured to extract keywords associated with data identical to data of the specified specific item included in the new metadata, from the content database, a keyword selecting unit configured to select at least one keyword from the keywords extracted by the keyword extracting unit, and a registration unit configured to register, in the content database, the at least one keyword selected through the keyword selecting unit, in association with the new content and the new metadata.

In some aspects of the present invention, the content management system configured as above can provide the same effects as those of the aforementioned information processing device.

According to aspects of the present invention, further provided is a method for managing contents with at least one keyword associated with each of the contents. The method is adapted to use a content database configured to store the contents with metadata and the at least one keyword associated with each of the contents, wherein the metadata is data accompanying each of the contents and includes a plurality of items of data, and a user database configured to store user identifiers with a specific item of the metadata associated with each of the user identifiers, the user identifiers each of which is an identifier adapted to identify a user of each of the contents. The method includes the steps of acquiring new content and new metadata accompanying the new content, extracting a user identifier for identifying a user of the new content, from the new metadata acquired, specifying a specific item associated with the extracted user identifier, based on the user database, extracting keywords associated with data identical to data of the specified specific item included in the new metadata, from the content database, selecting at least one keyword from the keywords extracted, and registering, in the content database, the at least one keyword selected, in association with the new content and the new metadata.

In some aspects of the present invention, the method adapted as above can provide the same effects as those of the aforementioned information processing device.

According to aspects of the present invention, further provided is a computer readable medium having computer readable instructions stored thereon to be executed by a computer that includes a content database configured to store contents with metadata and at least one keyword associated with each of the contents, wherein the metadata is data accompanying each of the contents and includes a plurality of items of data, and a user database configured to store user identifiers with a specific item of the metadata associated with each of the user identifiers, the user identifiers each of which is an identifier adapted to identify a user of each of the contents. The instructions cause the computer to perform the steps of acquiring new content and new metadata accompanying the new content, extracting a user identifier for identifying a user of the new content, from the new metadata acquired, specifying a specific item associated with the extracted user identifier, based on the user database, extracting keywords associated with data identical to data of the specified specific item included in the new metadata, from the content database, selecting at least one keyword from the keywords extracted, and registering, in the content database, the at least one keyword selected, in association with the new content and the new metadata.

In some aspects of the present invention, the computer readable medium adapted as above can provide the same effects as those of the aforementioned information processing device.

According to aspects of the present invention, further provided is an information processing device configured to be connected communicably with an external device that has a content database and a user database. The content database is configured to store contents with metadata and at least one keyword associated with each of the contents, the metadata being data accompanying each of the contents. The metadata includes a plurality of items of data. The user database is configured to store user identifiers with a specific item of the metadata associated with each of the user identifiers, the user identifiers each of which is an identifier adapted to identify a user of each of the contents. The information processing device includes an acquiring unit configured to acquire new content and new metadata accompanying the new content, an identifier extracting unit configured to extract a user identifier for identifying a user of the new content, from the new metadata acquired by the acquiring unit, a specific item requesting unit configured to send to the external device a request for a specific item to be associated with the extracted user identifier, along with the extracted user identifier, a specific item receiving unit configured to receive a specific item from the external device, a specific item data specifying unit configured to specify data of the received specific item included in the new metadata, a keyword requesting unit configured to send to the external device a request for keywords, along with the extracted user identifier and the specified data of the received specific item included in the new metadata, a keyword receiving unit configured to receive keywords from the external device, a keyword selecting unit configured to select at least one keyword from the received keywords, and a registration unit configured to register, in the content database, the at least one keyword selected, in association with the new content and the new metadata.

In some aspects of the present invention, the information processing device configured as above can provide the same effects as those of the aforementioned information processing device or data management system.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

An information processing device in an embodiment according to aspects of the present invention will be described with reference to the accompanying drawings. The information processing device in the embodiment is configured with a Multi Function Device (MFD) and a server communicable with the MFD via a network. Hereinafter, for the sake of simple explanation, the combination of the MFD and the server will be referred to as a "content management system." In the embodiment, the following description will be given based on an assumption that the MFD is adapted to receive facsimile contents.

1. Configuration of Content Management System

Figure 1:
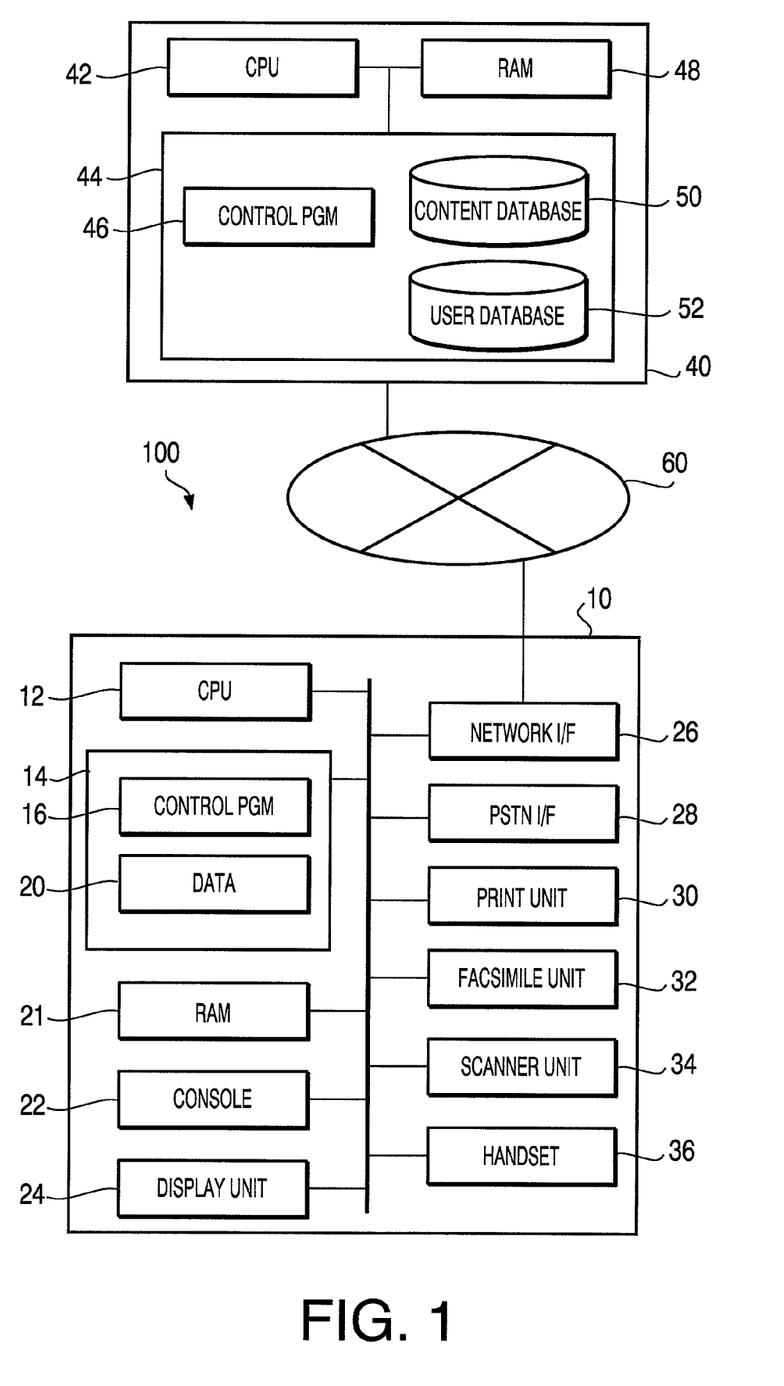
FIG. 1 is a block diagram schematically showing a configuration of a content management system in an embodiment according to one or more aspects of the present invention.

FIG. 1 is a block diagram schematically showing a content management system 100. The content management system 100 is configured with a server 40 and an MFD 10 that are connected with a network 60 and configured to mutually communicate via the network 60. The MFD 10 has a print function, a copy function, a facsimile function, a scanner function, and a telephone function. The MFD 10 includes a CPU 12, a storage 14, a RAM 21, a console 22, a display unit 24, a network interface 26, a Public Switched Telephone Networks (PSTN) interface 28, a print unit 30, a facsimile unit 32, a scanner unit 34, and a handset 36. It is noted that characters "I/F" and "PGM" shown in FIG. 1 denote "interface" and "program," respectively.

The CPU 12 controls the MFD 10 in accordance with a control program 16 stored on the storage 14. The below-mentioned processes to be executed by the MFD 10 are controlled in accordance with instructions written in the control program 16. Further, the storage stores various kinds of data 20. The RAM 21 temporarily stores content acquired and/or data transmitted by the server 40.

The console 22 is hardware to be operated by a user. The user can issue an intended command to the MFD 10 through the console 22. The network interface 26 is an interface for communicating with the server 40 via the network 60. The PSTN interface 28 is an interface through which the MFD 10 is connected with a public telephone line (not shown). The MFD 10 can transmit and receive telephone communication data or facsimile data (content) via the public telephone line. The print unit 30 is configured to attain the print function. The facsimile unit 32 is configured to attain the facsimile function. The scanner unit 34 is configured to attain the scanner function. The MFD 10 can achieve the copy function by using the scanner unit 34 in combination with the print unit 30. The handset 36 is used for the telephone function.

The MFD 10 is adapted to receive a print file (print content) from a terminal device connected with the network 60 and print the print content received. In addition, the MFD 10 is adapted to transmit and receive facsimile data (facsimile content). Further, the MFD 10 is adapted to scan content such as a text and an image printed on a sheet. Further, the MFD 10 is configured to record voice messages (voice communication content) received from another telephone device (not shown). Thus, the MFD 10 can acquire the print content, the scanned content, the facsimile content, the image content, and the voice communication content. In the following description, data that is received, scanned, or recorded by the MFD 10 will simply and generically be referred to as "content."

The MFD 10 acquires metadata about the content at the same time to acquire the content. The "metadata" is specific information defined along with acquiring the content. The metadata can be expressed in other words as data representing how the content is acquired. The metadata includes a plurality of items as described above.

The server 40 is provided with a CPU 42, a storage 44, and a RAM 48. The storage 44 stores a control program 46, a content database 50, and a user database 52. The below-mentioned processes to be executed by the server 40 are controlled by instructions written in the control program 46. The server 40 can register in the content database 50 the content and the metadata acquired by the MFD 10 in association with the user-desired keywords. Namely, the server 40 can store the content and the metadata acquired by the MFD 10 in association with the user-desired keywords.

2. Explanation of Content Database

Figure 2:
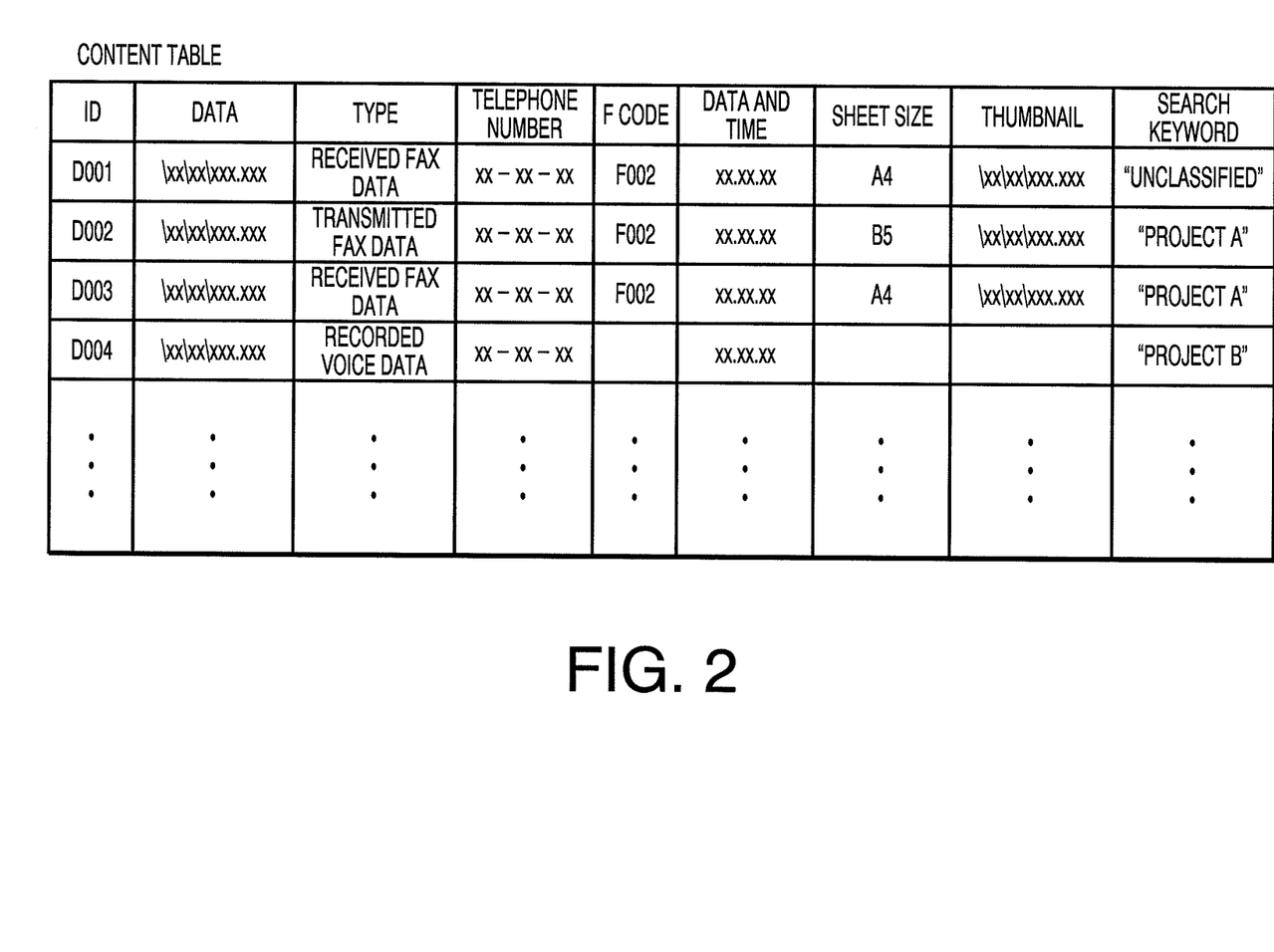
FIG. 2 exemplifies a content table in the embodiment according to one or more aspects of the present invention.

The content database 50 includes a plurality of content tables. In a content table, content and metadata acquired by the MFD 10 are registered in association with at least one keyword designated by the user. Each content table is associated with a user identifier. Namely, the content database 50 includes content tables associated with respective user identifiers, and each of the content tables has contents and respective metadata accompanying the contents registered in association with respective keywords. FIG. 2 exemplifies a content table.

In a content table, acquired content, metadata about the content, and one or more search keywords associated with the content (and the metadata) are registered as a record. A horizontal row in FIG. 2 corresponds to a record. The content table has a plurality of records, namely, a plurality of contents registered therein. Each record is given a content ID for identifying the record.

The acquired content is stored as a file. Each record has a file name written therein with a path representing a storage location of the acquired content. The file name that includes the path specifies what sort of content the user-intended one is. In the item "data" of the content table in FIG. 2, the file name that includes the path is stored.

The metadata about content includes a plurality of items. Each record exemplified in FIG. 2 has the items of metadata "type," "telephone number," "F code," "date and time," and "sheet size." In each of the items of metadata, metadata specific to the content is stored. In the item "type," an identifier that represents a function to acquire the content is stored. In the item "telephone number," the telephone number of a party device is stored in the case where the content is acquired through the public telephone line. In the item "F code," an F code is stored in the case where the content is received facsimile data. In the item "date and time," the date and time when the content is acquired is stored. In the item "sheet size," the size of a sheet on which the content is printed is stored. In the item "search keyword," a search keyword designated by the user or the character string "unclassified" is stored. The character strings shown in FIG. 2 "project A" and "project B" are user-designated search keywords. In each record as well, the file name of a thumbnail-size image is stored with a path for the thumbnail-size image. The thumbnail-size image is a reduced image of the content acquired. The thumbnail-size image is created by the server 40 when the keyword is registered. In addition, as mentioned below, in the embodiment, the F code corresponds to the user identifier that specifies the user of the information processing device. Therefore, the same F code ("F002" in FIG. 2) is given to the contents registered in a single content table.

3. Explanation of User Database

Figure 3:
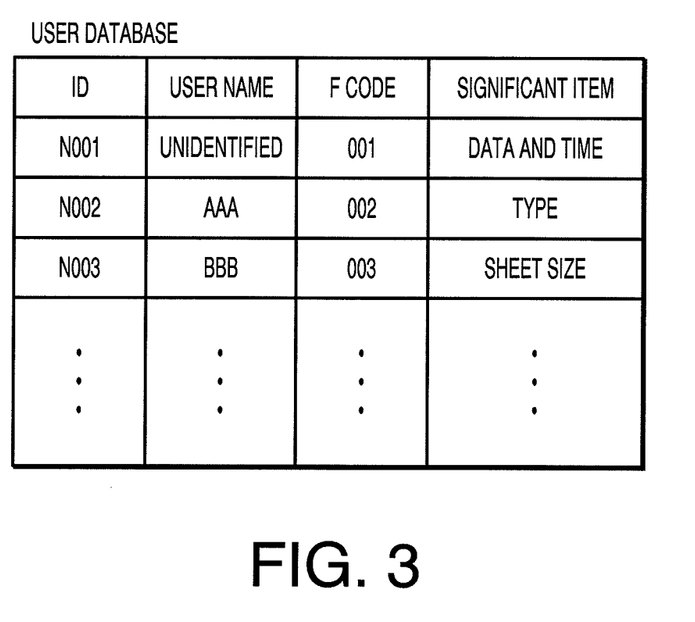
FIG. 3 exemplifies a user database in the embodiment according to one or more aspects of the present invention.

FIG. 3 exemplifies a user database 52. In the user database 52, a user name, an F code, and a significant item are registered in association with each other. A horizontal row in FIG. 3 represents a single record, and each record defines the association among the user name, the F code, and the significant item. A record ID is assigned to each record. In the "significant item," an item of data included in metadata is stored. The "significant item" denotes an item of metadata (metadata item) which the user identified with the F code emphasizes when classifying the acquired content. The "significant item" is previously registered in the user database. In the embodiment, the "F code" corresponds to a user identifier for identifying the user of the content. It is noted that a record with a user name of "unidentified" is a record for managing as a whole contents of which users cannot be identified. The aforementioned content database 50 includes a content table intended to as a whole manage contents of which users cannot be identified.

4. General Overview of Process by Content Management System

Figure 4:
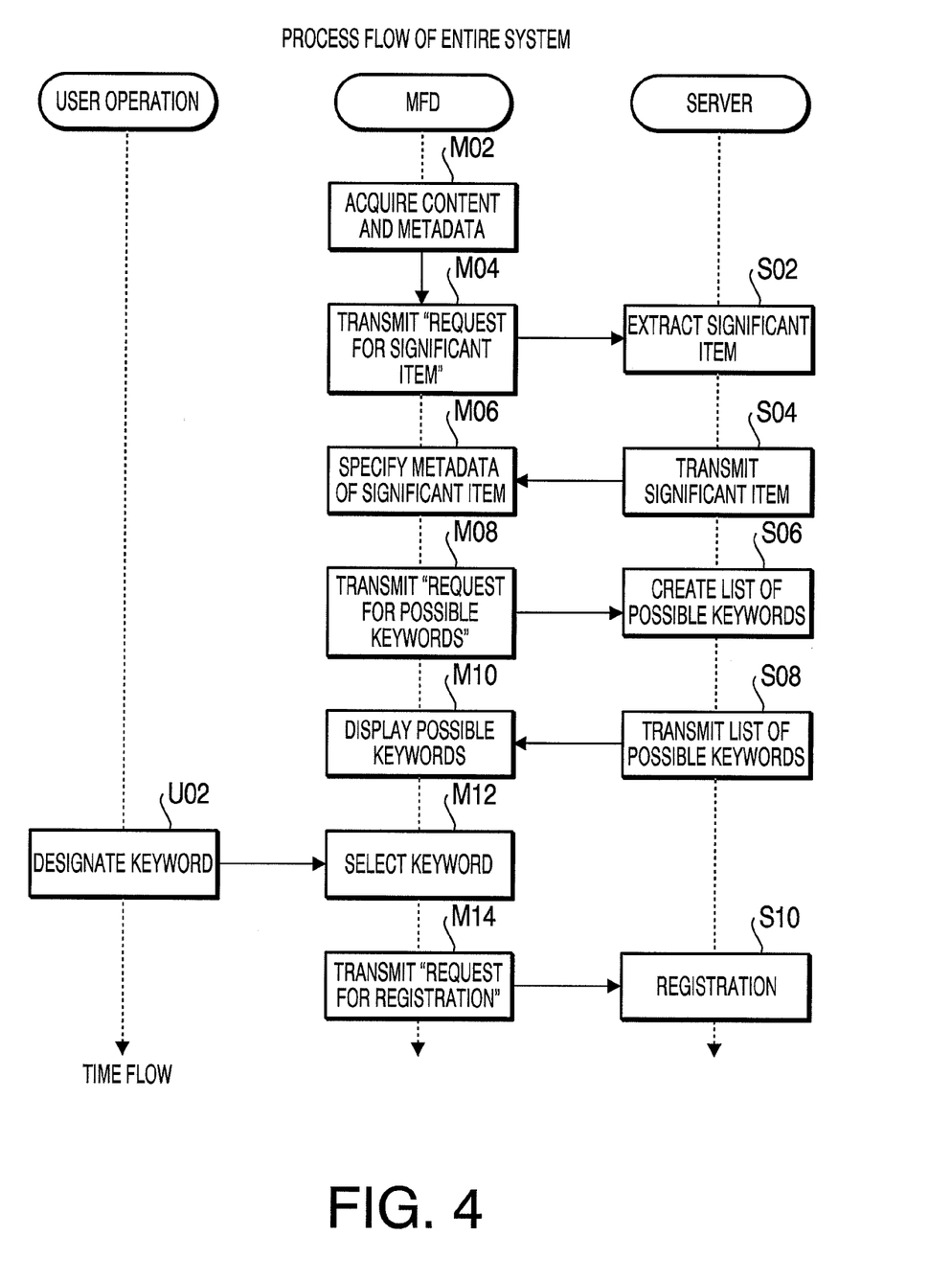
FIG. 4 show a flow of a process by the entire content management system in the embodiment according to one or more aspects of the present invention.

FIG. 4 shows a flow of a process by the entire content management system 100. The left side in FIG. 4 shows a user operation to the MFD 10. The center in FIG. 4 shows operations by the MFD 10. The right side in FIG. 4 shows operations by the server 40. A direction downward from an upside in FIG. 4 corresponds to a time flow. Hereinafter, the flow of the process by the entire content management system 100 will be described with reference to FIG. 4. Thereafter, a process by the MFD 10 and a process by the server 40 will be explained in detail.

The MFD 10 begins to receive facsimile data (facsimile content) (M02). The MFD 10 acquires metadata specified along with receiving the facsimile data when beginning to receive the facsimile data (M02). The MFD 10 extracts an F code (i.e., a user identifier) from the metadata, and transmits a "request for significant item" to the server 40 (M04). The "request for significant item," a below-mentioned "request for possible keywords," or a below-mentioned "request for registration" denotes a command issued by the MFD 10 to the server 40.

The server 40 which has received the "request for significant item" extracts a "significant item" associated with the received F code from the user database 52 (S02). The server 40 transmits the extracted "significant item" to the MFD 10 (S04). The MFD 10, which has received the "significant item," specifies metadata of the "significant item" included in the newly acquired metadata (M06). The MFD 10 sends a "request for possible keywords" to the server 40 along with the specified metadata (M08). The server 40 which has received the "request for possible keywords" extracts from the content database 50 records that include metadata corresponding to the received metadata (i.e., the metadata of the "significant item"). The server 40 employs search keywords included in the extracted records as possible keywords for the new content (S06). The server 40 sends the possible keywords to the MFD 10 (S08). The MFD 10 displays the received possible keywords on the display unit 24 (M10). Here, the user designates, from the possible keywords displayed, a possible keyword that the user wishes to get associated with the new content (U02). The MFD 10 selects the possible keyword designated by the user (M12). The MFD 10 transmits to the server 40 the selected possible keyword, the newly acquired content and metadata, and a "request for registration" (M14). The server 40 adds a new record to the content database 50, and registers in the new record the newly acquired content and metadata in association with the possible keyword selected (S10).

5. Processes by MFD

Figure 5:
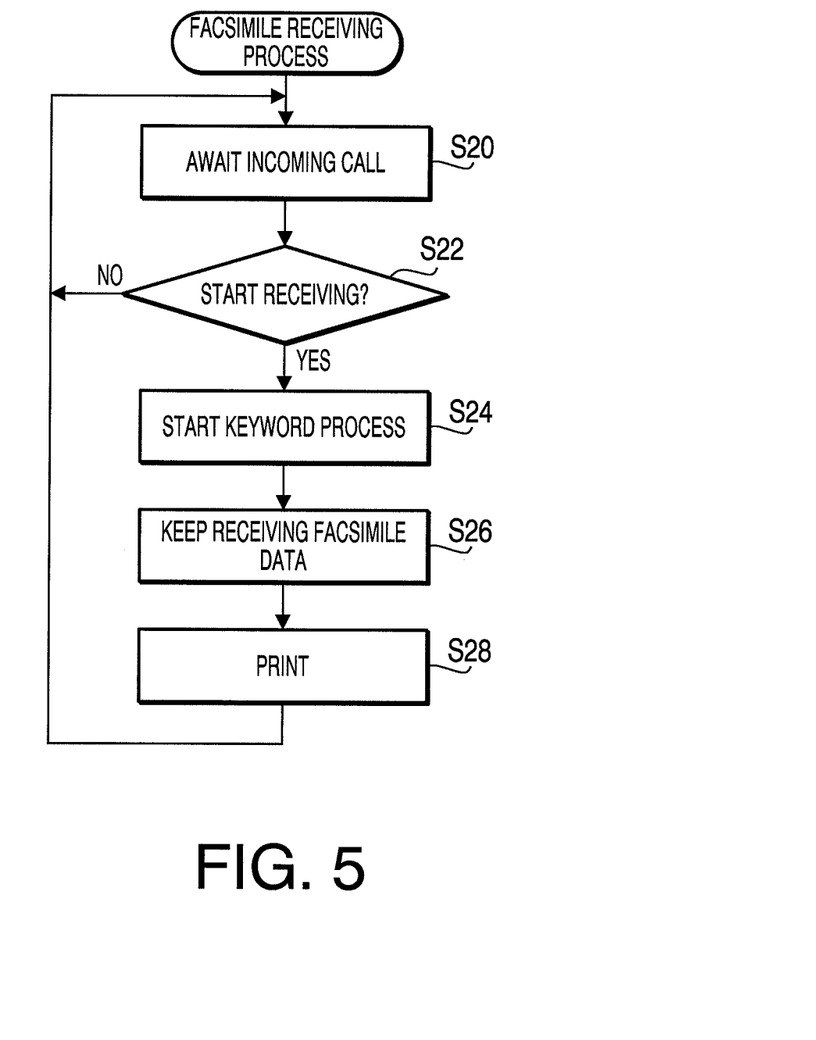
FIG. 5 is a flowchart showing a procedure of a facsimile receiving process to be executed by a Multi Function Device (MFD) in the embodiment according to one or more aspects of the present invention.
Figure 6:
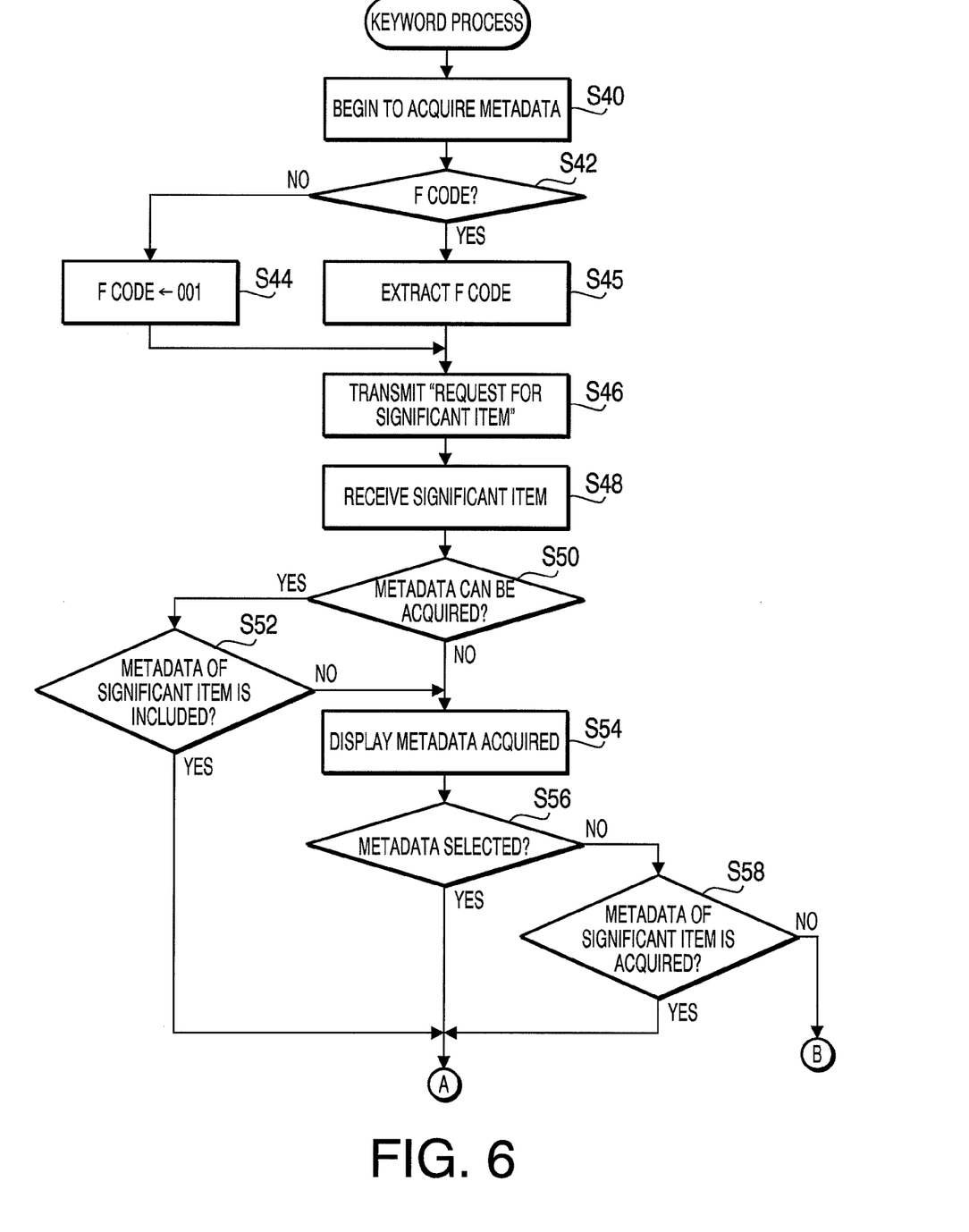
FIGS. 6 and 7 are flowcharts showing a procedure of a keyword process to be launched in the facsimile receiving process in the embodiment according to one or more aspects of the present invention.
Figure 7:
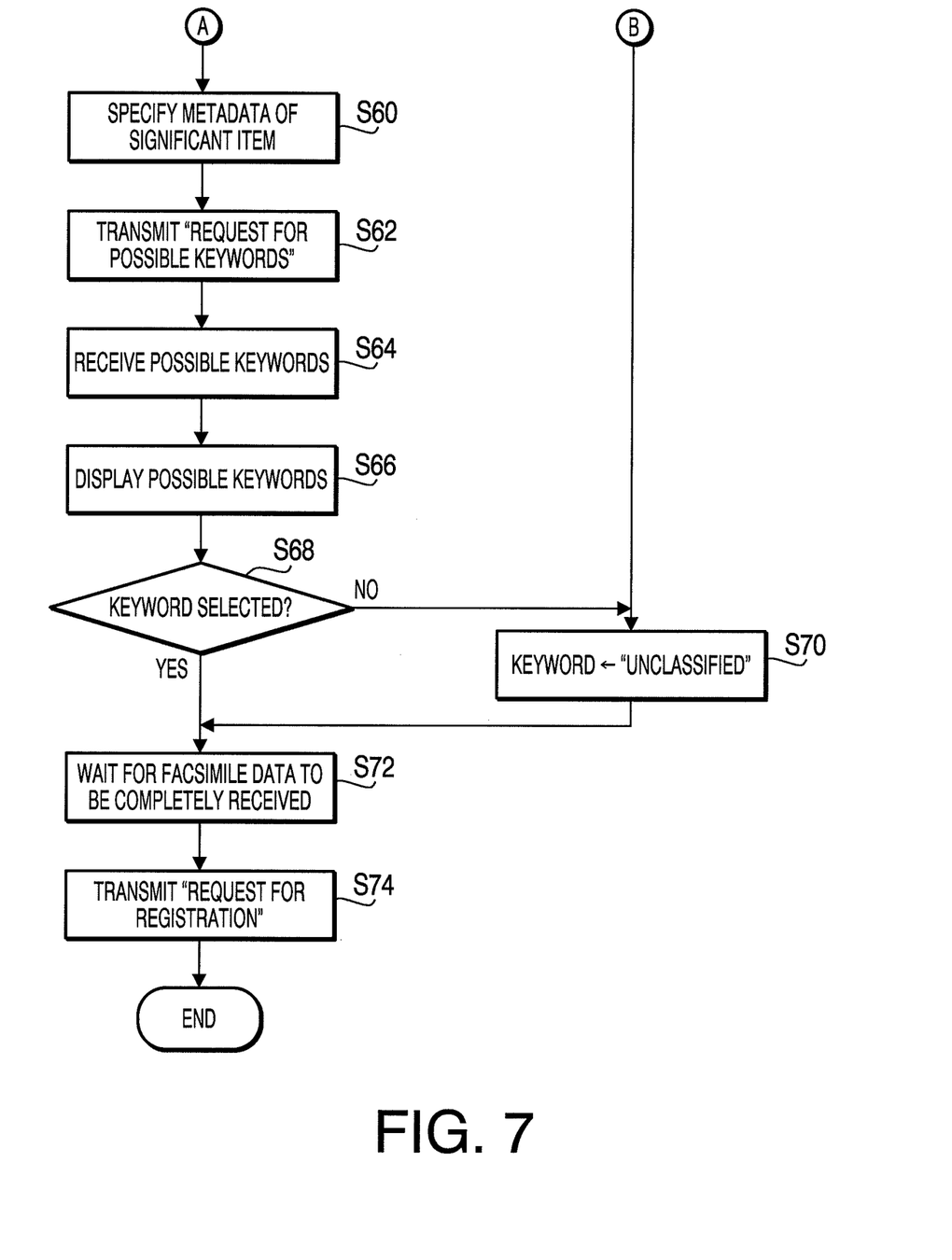

Processes to be executed by the MFD 10 will be described in detail with reference to FIGS. 5 to 7. FIG. 5 is a flowchart showing a procedure of a facsimile receiving process to be executed by the MFD 10. FIGS. 6 and 7 are flowcharts showing a procedure of a keyword process to be launched in the facsimile receiving process. When accepting an incoming call through a user operation, the MFD 10 begins to receive facsimile data (facsimile content) (S20, S22: Yes). Then, the MFD 10 launches the keyword process (S24), and continues to receive the facsimile data (S26). Namely, the operation of receiving the facsimile data and the keyword process are executed in parallel. After the facsimile data is completely received, the MFD 10 prints the facsimile data received (S28). Then the MFD 10 again awaits a next incoming call (S20). When beginning to receive the facsimile data without awaiting a user operation, the MFD 10 may store the received facsimile data on the RAM 21 and launch the keyword process in response to a user instruction.

Subsequently, the keyword process will be described with reference to FIGS. 6 and 7. As mentioned above, the MFD 10 begins to acquire the metadata accompanying the facsimile data when beginning to receive the facsimile data (S40). A telephone number and an F code of a sending source which transmits the facsimile data are specified along with the MFD 10 beginning to receive the facsimile data (facsimile content). On the other hand, the number of sheets is specified when the facsimile data is completely acquired. When the metadata includes an F code (S42: Yes), the MFD 10 extracts the F code from the metadata (S45). Meanwhile, when the metadata does not include an F code (S42: No), the MFD 10 sets a predetermined code ("001" in the embodiment) as an F code (S44). Then the MFD 10 sends to the server 40 a "request for significant item" along with the extracted F code or the set F code (S46). It is noted that the step S44 is a measure intended to enable the content management system 100 to perform the same process as when the acquired metadata includes an F code even though the acquired metadata does not include an F code. When the acquired metadata does not include an F code, the content management system 100 can manage newly acquired content as one of the contents managed as a whole in the "unidentified" group. In response to the "request for significant item," referring to the user database 52, the server 40 transmits to the MFD 10 a "significant item" associated with the F code. A process by the server 40 will be described later.

The MFD 10 receives the "significant item" from the server 40 (S48). The MFD 10 determines whether the metadata of the received "significant item" can be acquired by the time when the facsimile data is completely received (S50). For instance, the number of sheets is cited as metadata which cannot be acquired by the time when the facsimile data is completely received. When the metadata of the received "significant item" can be acquired by the time when the facsimile data is completely received (S50: Yes), the MFD 10 determines whether the acquired metadata includes the metadata of the "significant item" (S52). When the acquired metadata includes the metadata of the "significant item" (S52: Yes), the MFD 10 specifies the metadata of the "significant item" included in the acquired metadata (S60).

Meanwhile, when the metadata of the received "significant item" cannot be acquired by the time when the facsimile data is completely received (S50: No), or when the acquired metadata does not include the metadata of the "significant item" (S52: No), the MFD 10 displays the metadata already acquired (S54). The user can determine whether to select metadata of an alternative significant item from the metadata displayed (S56). When the user selects metadata of an alternative significant item (S56: Yes), the MFD 10 specifies the selected metadata (S60). When the user does not select metadata (S56: No), and when the MFD 10 can acquire the metadata of the "significant item" received in S48 while awaiting a user selection of metadata, the present process goes to S60. In this step, the MFD 10 specifies the metadata of the "significant item" received in S48 (S60). Meanwhile, when the user does not select metadata (S56: No), and when the MFD 10 cannot acquire the metadata of the "significant item" while awaiting a user selection of metadata (S58: No), the present process goes to S70.

The MFD 10, which has specified the metadata of the "significant item," transmits to the server 40 a "request for possible keywords" along with the specified metadata and F code (S62). In response to the "request for possible keywords," the server 40 transmits to the MFD 10 possible keywords and thumbnail-size images. The thumbnail-size images are thumbnail-size images associated with the possible keywords in the content database 50. A process by the server 40 will be described below. The MFD 10 receives the possible keywords and the thumbnail-size images (S64), and displays them (S66). The user can designate from the possible keywords displayed a keyword that the user wishes to get associated with the newly acquired content. The MFD 10 selects the possible keyword designated by the user (S68: Yes). Here, the MFD 10 waits for the facsimile data to be completely received (S72). When the facsimile data is completely received, the MFD 10 transmits to the server 40 the facsimile data (facsimile content), the metadata, the selected possible keyword, and a "request for registration" (S74).

Meanwhile, when the user does not designate any possible keyword, namely, when the MFD 10 does not select any possible keyword from the possible keywords displayed (S68: No), the MFD 10 employs a predetermined character string "unclassified" as a possible keyword (S70). Further, as mentioned above, when the MFD 10 cannot acquire the metadata of the "significant item" while awaiting a user selection of metadata (S58: No), the step S70 is as well performed. Then, the MFD 10 transmits to the server 40 the facsimile data (facsimile content), the metadata, the employed possible keyword, and the "request for registration" (S74). The character string "unclassified" is used to discriminate contents which are not associated with user-designated keywords from the other contents. In addition, the user can input a keyword that the user wishes to get associated with content of the character string "unclassified" through the console 22.

6. Processes by Server

Figure 8:
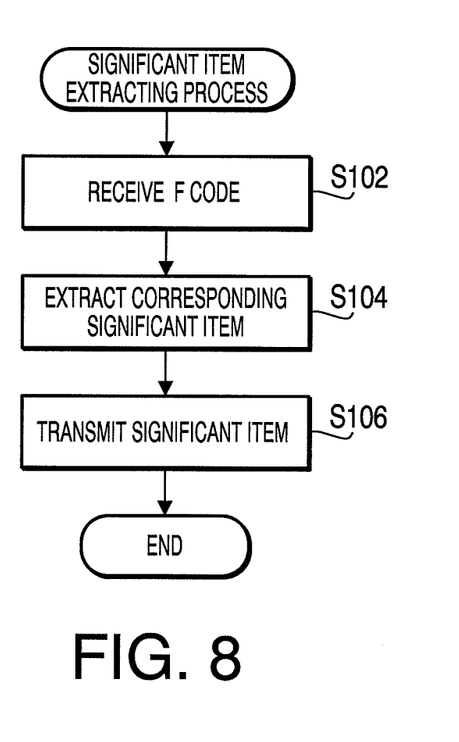
FIG. 8 is a flowchart showing a procedure of a significant item extracting process to be executed by a server in the embodiment according to one or more aspects of the present invention.

Processes to be executed by the server 40 will be described in detail. As mentioned above, the "request for significant item," the "request for possible keywords," and the "request for registration" are transmitted by the MFD 10 to the server 40. The server 40 performs a process responding to each of the request. FIG. 8 is a flowchart of a "significant item extracting process" to be executed in response to the "request for significant item." The server 40 receives an F code accompanying the newly acquired content, along with the "request for significant item" (S102). The server 40 extracts from the user database 52 a "significant item" associated with the received F code (S104). The server 40 transmits the extracted "significant item" to the MFD 10 (S106).

It is noted that, when the newly acquired metadata does not include an F code (see FIG. 6, S42: No), the MFD 10 sets a predetermined code as an F code, and then transmits the code (S44). This step is a step intended to manage contents of which F codes cannot be specified (namely, contents of which user identifiers cannot be specified) as a whole. In the user database 52, a "significant item" is registered for a predetermined F code (namely, an F code in the case of an unspecified user identifier). The record of the ID number "N001" in FIG. 3 indicates the "significant item" in the case of an unspecified user identifier.

Figure 9:
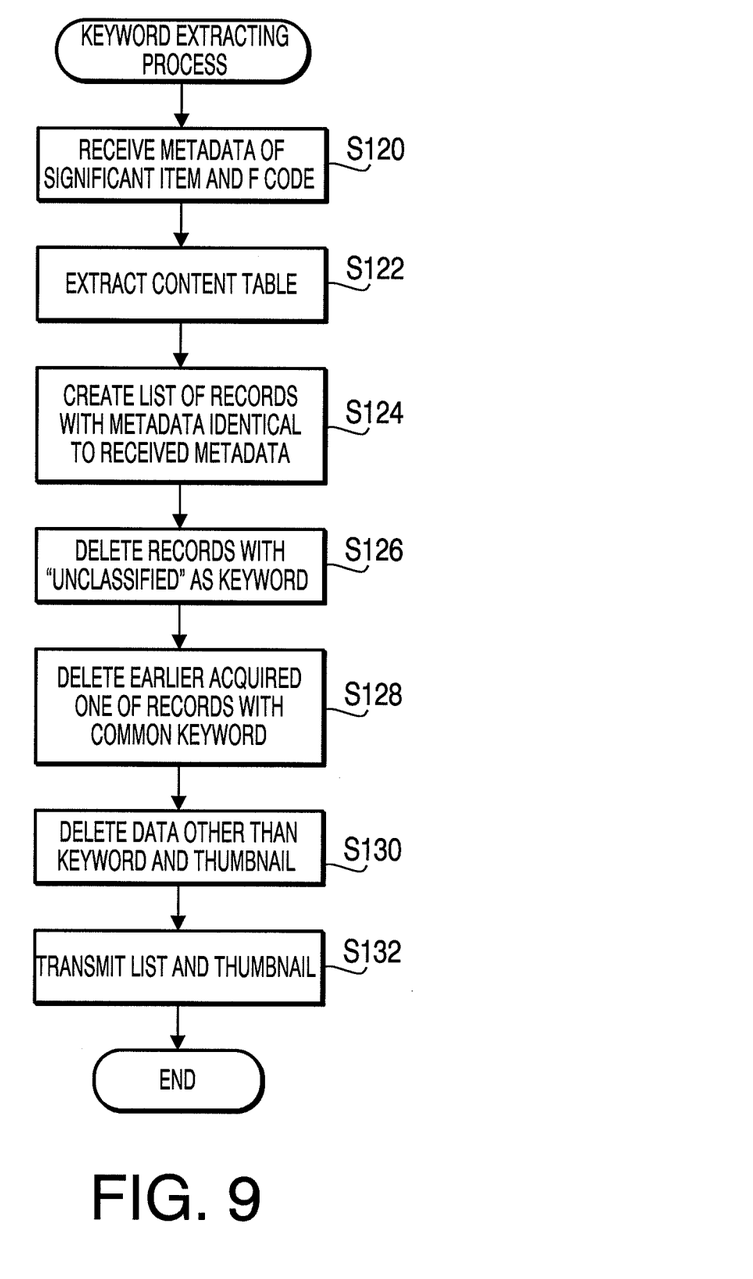
FIG. 9 is a flowchart showing a procedure of a keyword extracting process to be executed by the server in the embodiment according to one or more aspects of the present invention.

FIG. 9 is a flowchart of a "keyword extracting process" to be executed in response to the "request for possible keywords." The server 40 receives metadata of the "significant item" and an F code along with the "request for possible keywords" (S120). The server 40 extracts from the user database 52 an ID associated with the received F code. Further, the server 40 extracts from the content database 50 a content table corresponding to the ID (S122). It is noted that, when there is no content table corresponding to the received F code, the server 40 extracts a predetermined content table. The predetermined content table is a table employed in the aforementioned case of no F code specified (i.e., in the case of no user identifier specified).

The server 40 lists up, from the extracted content tables, records in which metadata of the "significant item" corresponds to the received metadata (S124). The server 40 deletes, from the records listed up, records in which the "unclassified" is set as the search keyword (S126). Further, the server 40 deletes, from records left on the list, earlier acquired ones of records which have a common search keyword (S128). Specifically, in S128, the server 40 deletes records other than the latest acquired one (which has the latest acquired date and time) of records which have a common search keyword. The server 40 deletes data other than search keywords and thumbnail-size images from records left on the list items (S130). Search keywords left in S130 are employed as possible keywords for the newly acquired content. Additionally, in S130, when two or more thumbnail-size images are associated with a search keyword, the latest thumbnail-size image remains. Thus the keyword extracting process is summarized to be a process for extracting from the content database 50 keywords associated with the same metadata as that for the "significant item" included in the new metadata. The server 40 transmits a list of the possible keywords and the thumbnail-size images to the MFD 10 (S132).

Figure 10:
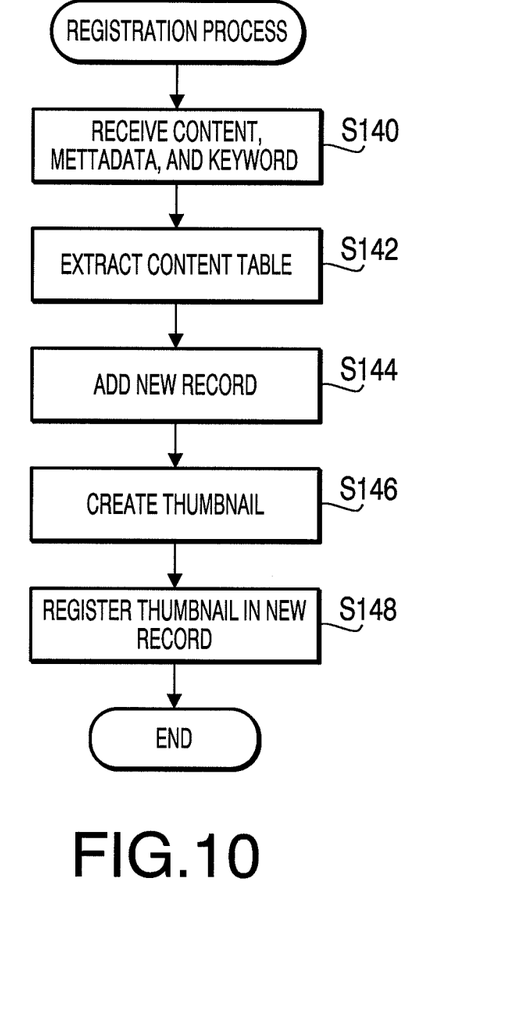
FIG. 10 is a flowchart showing a procedure of a registration process to be executed by the server in the embodiment according to one or more aspects of the present invention.

FIG. 10 is a flowchart of a "registration process" to be executed in response to the "request for registration." The server 40 receives new content, metadata accompanying the content, and a possible keyword selected by the user, along with the "request for registration" (S140). An F code is as well included in the metadata. The server 40 extracts from the user database 52 an ID associated with the F code in the received metadata. Further, the server 40 extracts from the content database 50 a content table that corresponds to the ID (S142). It is noted that, when there is no content table that corresponds to the F code included in the received metadata, the server 40 extracts a predetermined content table. The predetermined content table is a table employed in the aforementioned case of no F code specified (namely, in the case of no user identifier specified).

The server 40 adds a new record to the extracted content table (S144). In the new record, the new content, the metadata accompanying the content, and the keyword selected by the user are registered. Namely, the server 40 stores the new content in association with the keyword selected by the user. Finally, the server 40 creates a thumbnail-size image from the new content (S146), and registers the thumbnail-size image in the new record (S148).

The process to be executed by the content management system 100 is summarized as follows. The content management system 100 has the content database 50 in which contents, metadata, and keywords are stored in association with each other, and the user database 52 in which each user identifier is stored in association with metadata of a significant item. The content management system 100 performs the following operations:

- an acquiring step of acquiring content and metadata accompanying the content which metadata includes a plurality of items (S26 and S40);
- an identifier extracting step of extracting an user identifier (an F code) for identifying the user of the content from the metadata newly acquired in the acquiring step (S45);
- an item specifying step of specifying a significant item associated with the extracted user identifier based on the user database (S104);
- a keyword extracting step of extracting from the content database keywords associated with the same metadata as that for the significant item by comparing the newly acquired metadata with metadata in the content database 50 (the keyword extracting process in FIG. 11);
- a display control step of displaying the extracted keywords (S66);
- a keyword selecting step of selecting at least one keyword from the keywords displayed (S68); and
- a registration step of registering the at least one keyword selected, in association with the newly acquired content (the registration process in FIG. 10).

Through the aforementioned operations, especially through the operation in S104 and the keyword extracting process, possible keywords to be presented to the user are narrowed down, based on the significant item of the user. The content management system 100 is adapted to carefully select past keywords that the user is highly likely to designate and to display the selected keywords. Thus, the content management system 100 can assist the user who wishes to designate a keyword associated with past content as a keyword for new content.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of its versatility are shown and described in the present disclosure. It is to be understood that the present invention is capable of use in various other combinations and environments and is capable of changes or modifications within the scope of the inventive concept as expressed herein. For example, the following modifications are possible.

In the aforementioned embodiment, facsimile data is exemplified as content. However, the content may be any content that can be acquired by the MFD 10 (information processing device). Further, in the aforementioned embodiment, an F code is employed as a user identifier. However, the content management system 100 may employ a telephone number and a sending source mail address of a party device as a user identifier. The process or operations to be executed by the content management system 100 may be performed by a single device.

Further, in the content management system 100 of the aforementioned embodiment, content tables are provided in the content database 50, which content tables are associated with respective user identifiers. Namely, each content table stores thereon acquired contents classified in association with a common user identifier. However, the acquired contents may not classified by user identifier. In this case, the content management system 100 may extract keywords for different users in the keyword extracting process. Further, preferably, the content management system 100 may be configured to display thumbnail-size images associated with keywords for contents of users identified in terms of user identifiers, along with the keywords (possible keywords). For example, it is assumed that a user A and a user B designate a common keyword "AAA" for their respective contents. In this case, a thumbnail-size image associated with the keyword "AAA" of the user A is not identical to a thumbnail-size image associated with the keyword "AAA" of the user B. The content management system 100, which has acquired new content of the user A, displays the thumbnail-size image associated with the keyword "AAA" of the user A, regardless of the date and time when the thumbnail-size image was created. Namely, when a common keyword is utilized by a plurality of users, the content management system 100 displays a thumbnail-size image associated with a past keyword of a user. Such a configuration of the content management system 100 can further assist a user to select at least one keyword to be associated with acquired content.

What is claimed is:

1. An information processing device, comprising:
one or more non-transitory computer readable media storing:
computer readable instructions;
a content database configured to store contents with metadata and at least one keyword associated with each of the contents, wherein each metadata comprises data about the contents that is classified according to a plurality of items data and is defined and acquired at substantially a same time that the contents are acquired;
a user database configured to store user identifiers and the data classified according to the plurality of items, each of the user identifiers being associated with a specific item from among the plurality of items, and each of the user identifiers being adapted to identify a user of each of the contents; and a processor configured to execute the computer readable instructions to provide:
an acquiring unit configured to acquire new content and new metadata contemporaneous with and accompanying the new content;
an identifier extracting unit configured to extract a user identifier from the new metadata acquired by the acquiring unit, the extracted user identifier identifying the user of the new content;
a specific item specifying unit configured to specify the specific item associated with the user identifier that is stored in the user database and that corresponds to the extracted user identifier;
a keyword extracting unit configured to extract keywords from the content database that are associated with existing metadata stored in the content database, the existing metadata including certain data that is identical to data included in the new metadata that is classified according to the specific item specified by the specific item specifying unit;
a keyword selecting unit configured to select at least one keyword from the keywords extracted by the keyword extracting unit; and
a registration unit configured to register, in the content database, the at least one keyword selected through the keyword selecting unit, in association with the new content and the new metadata from which the user identifier is extracted by the identifier extracting unit.

2. The information processing device according to claim 1, further comprising a display configured to display the keywords extracted by the keyword extracting unit,
wherein the keyword selecting unit is configured to select at least one keyword from the keywords displayed on the display.

3. The information processing device according to claim 1, wherein the executed computer readable instructions further provide an alternative item specifying unit configured to specify an alternative item, different from the specified specific item, of the new metadata as a substitute for the specified specific item, provided that data that is identical to the data included in the new metadata and classified according to the specific item cannot be acquired.

4. The information processing device according to claim 1, further comprising an image creating device configured to create a reduced image for the new content,
wherein the registration unit is configured to register, in the content database, the reduced image created in association with the at least one keyword selected through the keyword selecting unit.

5. The information processing device according to claim 2, further comprising an image creating device configured to create a reduced image for the new content,
wherein the registration unit is configured to register, in the content database, the reduced image created in association with the at least one keyword selected through the keyword selecting unit.

6. The information processing device according to claim 5, wherein the display is configured to display the extracted keywords and reduced images, each of the reduced images being a latest one of reduced images registered in association with each of the extracted keywords in the content database.

7. The information processing device according to claim 1, configured with a facsimile function,
wherein the contents managed by the information processing device include facsimile data, and wherein the user identifiers each of which is adapted to identify the user of each of the contents include an F code for the facsimile function.

8. A content management system configured to manage contents with at least one keyword associated with each of the contents, comprising:
one or more non-transitory computer readable media storing:
computer readable instructions;
a content database configured to store contents with metadata and at least one keyword associated with each of the contents, wherein each metadata comprises data about the contents that is classified according to a plurality of items data and is defined and acquired at substantially a same time that the contents are acquired;
a user database configured to store user identifiers and the data classified according to the plurality of items, each of the user identifiers being associated with a specific item from among the plurality of items, and each of the user identifiers being adapted to identify a user of each of the contents; and
a processor configured to execute the computer readable instructions to provide:
an acquiring unit configured to acquire new content and new metadata contemporaneous with and accompanying the new content;
an identifier extracting unit configured to extract a user identifier from the new metadata acquired by the acquiring unit, the extracted user identifier identifying the user of the new content;
a specific item specifying unit configured to specify the specific item associated with the user identifier that is stored in the user database and that corresponds to the extracted user identifier;
a keyword extracting unit configured to extract keywords from the content database that are associated with existing metadata stored in the content database, the existing metadata including certain data that is identical to data included in the new metadata that is classified according to the specific item specified by the specific item specifying unit;
a keyword selecting unit configured to select at least one keyword from the keywords extracted by the keyword extracting unit; and
a registration unit configured to register, in the content database, the at least one keyword selected through the keyword selecting unit, in association with the new content and the new metadata from which the user identifier is extracted by the identifier extracting unit.

9. The content management system according to claim 8, further comprising a display configured to display the keywords extracted by the keyword extracting unit,
wherein the keyword selecting unit is configured to select at least one keyword from the keywords displayed on the display.

10. The content management system according to claim 8, wherein the executed computer readable instructions further provide an alternative item specifying unit configured to specify an alternative item, different from the specified specific item, of the new metadata as substitute for the specified specific item, provided that the data of the specified specific item included in the new metadata cannot be acquired.

11. The content management system according to claim 8, further comprising an image creating device configured to create a reduced image for the new content,
wherein the registration unit is configured to register, in the content database, the reduced image created in association with the at least one keyword selected through the keyword selecting unit.

12. The content management system according to claim 9, further comprising an image creating device configured to create a reduced image for the new content,
wherein the registration unit is configured to register, in the content database, the reduced image created in association with the at least one keyword selected through the keyword selecting unit.

13. The content management system according to claim 12,
wherein the display is configured to display the extracted keywords and reduced images, each of the reduced images being a latest one of reduced images registered in association with each of the extracted keywords in the content database.

14. The content management system according to claim 8, configured with a facsimile function,
wherein the contents managed by the content management system include facsimile data, and
wherein the user identifiers each of which is adapted to identify the user of each of the contents include an F code for the facsimile function.

15. The content management system according to claim 8, comprising a data acquiring device and a content management device,
wherein the data acquiring device includes:
the acquiring unit;
the identifier extracting unit; and
the keyword selecting unit, and
wherein the content management device includes:
the content database;
the user database;
the specific item specifying unit;
the keyword extracting unit; and
the registration unit.

16. A method for managing contents with at least one keyword associated with each of the contents,
the method being adapted to use computer readable instructions stored on one or more non-transitory computer readable media that further store:
a content database configured to store contents with metadata and at least one keyword associated with each of the contents, wherein each metadata comprises data about the contents that is classified according to a plurality of items data and is defined and acquired at substantially a same time that the contents are acquired;
a user database configured to store user identifiers and the data classified according to the plurality of items, each of the user identifiers being associated with a specific item from among the plurality of items, and each of the user identifiers being adapted to identify a user of each of the contents; and
the method comprising the steps of:
acquiring new content and new metadata contemporaneous with and accompanying the new content;
extracting a user identifier from the new metadata acquired contemporaneous with the new contents, the extracted user identifier identifying the user of the new content;
specifying the specific item associated with the user identifier that is stored in the user database and that corresponds to the extracted user identifier;
extracting keywords from the content database that are associated with existing metadata stored in the content database, the existing metadata including certain data that is identical to data included in the new metadata that is classified according to the specified specific item;

selecting at least one keyword from the keywords extracted by the keyword extracting unit; and registering, in the content database, the at least one keyword selected through the keyword selecting unit, in association with the new content and the new metadata from which the user identifier is extracted by the identifier extracting unit.

17. A non-transitory computer readable medium having computer readable instructions stored thereon to be executed by a computer that includes:

a content database configured to store contents with metadata and at least one keyword associated with each of the contents, wherein each metadata comprises data about the contents that is classified according to a plurality of items and is defined and acquired at substantially a same time that the contents are acquired;

a user database configured to store user identifiers and the data classified according to the plurality of items, and each of the user identifiers being associated with a specific item from among the plurality of items, and each of the user identifiers being an identifier adapted to identify a user of each of the contents, wherein the instruction cause the computer to perform the steps of:

acquiring new content and new metadata contemporaneous with and accompanying the new content;

extracting a user identifier from the new metadata acquired contemporaneous with the new contents, the extracted user identifier identifying the user of the new content;

specifying the specific item associated with the user identifier that is stored in the user database and that corresponds to the extracted user identifier;

extracting keywords from the content database that are associated with existing metadata stored in the content database, the existing metadata including certain data that is identical to data included in the new metadata that is classified according to the specified specific item;

selecting at least one keyword from the keywords extracted by the keyword extracting unit; and registering, in the content database, the at least one keyword selected through the keyword selecting unit, in association with the new content and the new metadata from which the user identifier is extracted by the identifier extracting unit.

18. An information processing device configured to be connected communicably with an external device, the external device having a content database and a user database, the content database being configured to store contents with metadata and at least one keyword associated with each of the contents, wherein each metadata comprises data about the contents that is classified according to a plurality of items and defined and acquired at substantially a same time that the contents are acquired;

the user database being configured to store user identifiers and the data classified according to the plurality of items, each of the user identifiers being associated with a specific item from among the plurality of items, and each of the user identifiers being adapted to identify a user of each of the contents; and the information processing device comprising one or more non-transitory computer readable media storing computer readable instructions and configured to execute the computer readable instructions to provide:

an acquiring unit configured to acquire new content and new metadata contemporaneous with and accompanying the new content;

an identifier extracting unit configured to extract a user identifier from the new metadata acquired by the acquiring unit, the extracted user identifier identifying the user of the new content;

a specific item requesting unit configured to send to the external device a request for the specific item associated with the user identifier that is stored in the user database and that corresponds to the extracted user identifier;

a specific item receiving unit configured to receive the specific item from the external device;

a specific item specifying unit configured to specify data classified according to the received specific item that is included in the new metadata;

a keyword requesting unit configured to send to the external device a request for keywords, along with the extracted user identifier and the data classified according to the received specific item that is included in the new metadata and specified by the specific item specifying unit;

a keyword receiving unit configured to receive keywords from the external device, the keywords received from the external device being associated with existing metadata stored in the content database, and the existing metadata including certain data that is identical to data included in the new metadata that is classified according to the specific item specified by the specific item specifying unit;

a keyword selecting unit configured to select at least one keyword from the keywords extracted by the keyword extracting unit; and a registration unit configured to register, in the content database, the at least one keyword selected through the keyword selecting unit, in association with the new content and the new metadata from which the user identifier is extracted by the identifier extracting unit.

* * * * *